US007001435B2

(12) United States Patent
Slattery et al.

(10) Patent No.: US 7,001,435 B2
(45) Date of Patent: Feb. 21, 2006

(54) LEATHER TREATMENT

(75) Inventors: Doug Slattery, Wildwood, MO (US); Eric Waerkerle, Fenton, MO (US); Don Kamp, St. Genevieve, MO (US)

(73) Assignee: Automotive Technology, Inc., Fenton, MO (US)

( * ) Notice: Subject to any disclaimer, the term of this patent is extended or adjusted under 35 U.S.C. 154(b) by 114 days.

(21) Appl. No.: 10/424,505

(22) Filed: Apr. 28, 2003

(65) Prior Publication Data

US 2003/0221264 A1 Dec. 4, 2003

Related U.S. Application Data

(63) Continuation-in-part of application No. 10/158,441, filed on May 30, 2002, now abandoned.

(51) Int. Cl.

| | |
|---|---|
| ***C08G 8/32*** | (2006.01) |
| ***C08L 61/26*** | (2006.01) |
| ***D06M 19/00*** | (2006.01) |
| ***C14C 1/00*** | (2006.01) |

(52) U.S. Cl. .................. 8/94.1; 8/127; 8/517; 523/416; 524/104; 524/489; 428/310; 428/473

(58) Field of Classification Search ................ 523/416; 8/517, 94.1, 127; 524/104, 489; 428/310, 428/473

See application file for complete search history.

(56) References Cited

U.S. PATENT DOCUMENTS

| | | | | |
|---|---|---|---|---|
| 3,765,924 | A * | 10/1973 | Craven | 427/336 |
| 3,919,451 | A * | 11/1975 | Levy et al. | 428/314.2 |
| 4,256,809 | A * | 3/1981 | Larsson et al. | 428/473 |
| 4,371,637 | A * | 2/1983 | Topfl | 523/416 |
| 5,354,341 | A | 10/1994 | Moser et al. | 8/437 |
| 5,376,147 | A | 12/1994 | Page et al. | 8/437 |
| 6,001,906 | A * | 12/1999 | Golumbic | 524/104 |
| 6,228,926 | B1 * | 5/2001 | Golumbic | 524/489 |
| 6,290,866 | B1 | 9/2001 | Lesko et al. | 252/8.57 |
| 6,387,291 | B1 | 5/2002 | Lesko et al. | 252/8.57 |
| 6,471,885 | B1 | 10/2002 | Chiang et al. | 252/8.57 |

* cited by examiner

*Primary Examiner*—Yogendra N. Gupta

*Assistant Examiner*—Preeti Kumar

(74) *Attorney, Agent, or Firm*—Haverstock, Garrett & Roberts LLP

(57) ABSTRACT

An improved method for dyeing leather wit propylene glycol monomethyl ether (PGME) systems comprising adding polyacrylate resins base, C-3 and C-4 alcohols, and n-butyl acetate and negating the need for aqueous compositions, Teflon dispersions, dibutyl phthalate, and improves the dye penetration, hastens the flash times, improves the dust free time, and improves the tape time.

6 Claims, No Drawings

LEATHER TREATMENT

This application is a continuation-in-part of U.S. application Ser. No. 10/158,441 filed May 30, 2002 now abandoned.

BACKGROUND OF THE INVENTION

1. Field of the Invention

This invention relates to leather coating compositions, particularly those compositions for dyeing, staining, or otherwise modifying the color of leather.

2. Background of the Prior Art

In recent years numerous advancements have been made in processes for coloring leather. U.S. Pat. No. 5,354,341 disclosed a mixture of at least 2 metal-free dyes having a trichromatic formulation that enhances the brilliance of the finished color on the leather. The dyes carry a single sulfo or carboxyl group and molecular weight of 450 to 700. The dyeing time routinely requires 30 to 180 minutes to dry.

U.S. Pat. No. 5,376,147 likewise disclosed improvements in the trichromatic technique by employing dyes having two sulfo or carboxyl groups and molecular weights between 790 to 1100, but the dyeing process still required 30 to 180 minutes to dry.

U.S. Pat. No. 6,290,866 disclosed that an aqueous coating composition comprising copolymerized acetoacetate or acetoacetamide monomer and copolymerized carboxylic acid monomer, in contact with metal oxide, hydroxide, or carbonate provided aesthetically pleasing and protective dried coatings on leather that had good embossability and wet-flex resistance. No enhancements in processing time at ambient temperature were noted; however, when drying at elevated temperatures of about 200° F. (93.3° C.), drying time still required at least 2.0 minutes.

U.S. Pat. No. 6,387,291 discloses raising the glass transition temperature of the above-described aqueous coating compositions by increasing the amount of copolymerized acetoacetate or acetoacetamide. Again the leather products required 2 minutes or 120 seconds to dry at elevated temperatures of 93.3° C.

U.S. Patent 6,471,885 discloses a multistage emulsion polymer for an aqueous leather coating composition, said polymer containing copolymerized monoethylenically—unsaturated nonionic monomer which are predominantly acrylic, i.e. monomers selected from, e.g. esters of (meth) acrylic acid. It also contains copolymerized monoethylenically—unsaturated carboxylic acid monomer. Again, however, the coated leather required 120 seconds to dry at 90° C.

Currently, state-of-the art aqueous coating compositions employed for dyeing leather employ dye mixtures of all types dispersed in propylene glycol monomethyl ether. Even with predominantly acrylic polymers, certain vehicles have been used for enhancing dye penetration, for example polytetrafluoroethylene, (i.e. teflon), and carboxylic acid derivatives such as dibutyl phthalate have been employed as an elastomeric plasticizer to help soften the leather. However, the enhanced dye penetration still requires, at ambient temperature, leather dyeing process times of 5 to 10 minutes and higher before dry surface is obtained. Also, the quality of the finish is not as soft and natural as desired, even though dibutyl phthalate is used.

An improved leather dyeing process with enhanced drying or "flash time" while still providing aesthetically pleasing soft natural coatings with good wet-flex resistance is a long felt need in the industry.

DETAILED DESCRIPTION

In the process of the present invention leathers are coated with dye mixtures prepared on a polyacrylate vehicle, dispersed in propylene glycol monomethyl ether, n-butyl acetate, and a mixture of C-3 and C-4 alcohols, thus negating the need for an aqueous composition, teflon dispersions and carboxylic acid derivatives such as dibutyl phthalate. The leather coating process results in improved dye penetration and processing at ambient conditions, surprisingly drying said leather in less than 1.0 minute, preferably 30 seconds.

Compositions of the present invention may be applied to all types of leather such as, for example, mineral tanned or vegetable tanned leather including full-grain leather, buffed or corrected-grain leather, and split leather with or without a prior treatment with an impregnating resin mixture and with or without the application of subsequent coatings using conventional coatings application methods such as, for example, curtain coater and spraying methods such as, for example, air-atomized spray, air-assisted spray, airless spray, high volume low pressure spray, and air-assisted airless spray.

The compositions of the present invention require at least one dye or pigment and a polyacrylate polymer vehicle. Additionally, conventional coating adjuvants may be contained in the composition. Such adjuvants may include, for example, emulsifiers, coalescing agents, buffers, neutralizers, thickeners, humectants, wetting agents, biocides, plasticizers, antifoaming agents, colorants, waxes, and antioxidants.

The polyacrylate vehicle may include, for example, a (meth)acrylic ester monomer including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, aminoalkyl (meth)acrylates the polyacrylate and pigment will be substantially dissolved in from 30–65% by weight of a solvent, preferably n-butyl acetate capable of dissolving nitrocellulose (lacquer) as well as dyes and pigments, and which is compatible with leather.

The quick-drying compositions of the present invention comprises polyacrylate resin, n-butyl acetate, dye or pigment, propylene glycol monomethyl ether and C-3/C-4 alcohols.

In a preferred embodiment the composition of this invention may comprise an effective amount of dye or pigment constituents dispersed in, by weight, 20–32 parts propylene glycol monomethyl ether, preferably 28.0 parts; 10–15 parts isobutyl alcohol, preferably 12.0 parts; 8–12 parts isopropyl alcohol, preferably 10.0 parts; 3–5 parts n-butanol, preferably 4.0 parts; 20–25 parts n-butyl acetate, preferably 22.4 parts; 5–15 parts polyacrylate resin, preferably 5.5 parts. The overall amount of C3 and C4 alcohol is 21–32 parts.

The dyes can be either metallic or metal-free colorants of the type readily available in the prior art.

Especially preferred dye mixture and polyacrylate vehicle may be obtained from SPIES HECKER as Nos. 293 and 295.

To a dye mixture and polyacrylate vehicle such as Spies Hecker 293 or 295 comprising 100 parts by weight is added an equal portion of 100 parts of a solvent mixture such as Spies Hecker 8581, comprising 50–60% by weight propylene glycol monomethyl ether, 20–30% C-4 alcohol (preferably isobutyl alcohol), 15–25% C-3 alcohol (preferably isopropyl alcohol), and if desired additional minor amounts of other C-3 or C-4 alcohols such as n-butanol and n-propanol.

When coating the leather one must first clean the surface. The surface can be cleaned with ammonia water if extremely soiled. Then the leather may be cleaned (to return the leather to a bare state, removing all existing dyes, if desired) with the solvent mixture, such as SH 8581. Then the above-described composition of the invention is sprayed onto the leather, using 2–6 coats and allowing less than a minute, preferably 15–30 seconds flash time between coats.

The materials become dust free in 30 seconds. "Dust-free" identifies the condition in which the coating sets to the point that dust will not become trapped in it.

The materials exhibit tape time 30 seconds. Tape time is the condition where the materials are dry enough to tape on without leaving any tape marks.

When a leather dye is sprayed onto the leather, the "overspray" created from the spraying operation will normally set on the areas surrounding the actual surface point sprayed. The compositions of the present invention will absorb into the surrounding area, such that blending or repair is invisible. This condition is commonly referred to as "zero overspray".

For purposes of this description and in the claims, parts and percentages are by weight unless otherwise specified.

EXAMPLE

SURE COAT NO. 1601, having a toner color of black was acquired from SEM Products, Inc. and applied to the surface of a control leather strip and the results are reflected below in Table 1. However, prior to application, the leather surfaces were cleaned with SURE COAT NO. 3635 which was clear of toner.

The Sure Coat specimen were cleaned with a clear Sure Coat prior to spraying the Sure Coat and toner.

Two compositions (A and B) of the present invention was prepared, composition A by admixing 1.0 part SPIES HECKER 293 and 1.0 part SPIES HECKER 8581 and the composition B by admixing 1.0 part SPIES HECKER 295 and 1.0 part SPIES HECKER 8581. Two identical leather surfaces were selected as specimen A and B, and each was first cleaned with the SPIES HECKER 8581 by liberal application and immediate wiping with a cloth so that the 8581 did not evaporate on the surface. The specimen were taped for similar masking of graphic patterns to be dyed. Composition A was sprayed onto specimen A in six (6) coatings. Also six (6) coatings of composition B was sprayed onto specimen B. Flash times between each coating for each specimen was from 15 to 30 seconds, which was sufficient time to allow the coating to become dry to the touch prior to applying the subsequent coating. The taping was removed. Neither specimen A or B showed any build up of dye or pigment, unlike the Sure Coat system.

The overspray for A and B was absorbed into the leather so that after merely 30 seconds no dust could be trapped within the coating. That is, it was dust free after 30 seconds.

The specimen A and B were each dry enough in 30 seconds to tape over without leaving tape marks. The specimen did not require clear overcoating because the original coating completely penetrated the leather.

Specimen A and B results and comparisons are as follows:

TABLE 1

| TEST | SURE COAT | SPECIMEN A | SPECIMEN B |
|---|---|---|---|
| Flash time | 300–600 seconds | 30 seconds | 30 seconds |
| Dust free | 1200 seconds | 30 seconds | 30 seconds |
| Tape time | 3,600 seconds | 30 seconds | 30 seconds |
| Final clear overcoating | Required to cover up surface imperfections thus resulting in hiding natural leather grain and giving a more vinyl-like appearance. | Not required because of dye absorption, resulting in more natural appearance to leather and more flexibility in the leather. However, satin clear coating is possible for added durability without losing appearance or texture flexibility.* | Not required because of dye absorption, resulting in more natural appearance to leather and more flexibility in the leather. However, satin clear coating is possible for added durability without losing appearance or texture flexibility. |

*clear coating can be with for example SH 8070

TABLE 2

SH 8581

| INGREDIENT | CAS-NO | WEIGHT PERCENT |
|---|---|---|
| Propylene glycol monomethyl ether | 107-98-2 | 56.0 |
| Isobutyl alcohol | 78-83-1 | 23.9 |
| Isopropyl alcohol | 67-63-0 | 20.0 |
| n-butanol | 71-36-3 | 0.1 |

TABLE 3

SH 295

| INGREDIENT | CAS-NO. | PERCENT (WEIGHT) |
|---|---|---|
| n-Butyl acetate | 129-86-4 | 44.1–45.7 |
| Polyacrylate resin | | 10.6–11.4 |
| n-Butanol | 71-38-3 | 7.0–8.2 |
| Cellulose, acetate butanoate | 9004-38-8 | 6.4–6.8 |
| Butyl glycolate | 7397-62-8 | 4.7–4.9 |
| Mica | 12001-26-2 | 4.2–8.2 |
| Xylene | 1330-20-7 | 3.4–3.6 |
| 2-Butoxyethyl acetate | 112-07-2 | 3.0–3.2 |
| Titanium dioxide | 13463-67-7 | 2.8–6.4 |
| White Spirit | 64742-82-1 | 2.3–2.4 |
| Melamine resin | | 2.1–2.2 |
| Ethyl benzene | 100-41-4 | 1.4–1.5 |
| Dipropylene glycol methyl ether | 34590-94-8 | 1.5 |
| Isobutyl alcohol | 78-83.1 | 1 |
| Chromium oxide | 1308-38-9 | 0–1.2 |
| Iron oxide | 1309-37-1 | 0–5.8 |
| Formaldehyde | 50-00-0 | 0.1 |
| Suspected Human Carcinogen | | |

TABLE 4

SH 293

| INGREDIENT | CAS-NO. | PERCENT (WEIGHT) |
|---|---|---|
| n-Butyl acetate | 123-88-4 | 25.1–55.3 |
| Polyacrylate resin additives | | 5.9–48.0 |
| 1-Ethoxy 2 Propanol | 52126-53-6 | 0–10.3 |
| n-Butanol | 71-35-3 | 0.1–10.9 |
| Cellulose acetate butanoate | 9004-36-5 | 0–5.7 |

TABLE 4-continued

| SH 293 | | |
|---|---|---|
| INGREDIENT | CAS-NO. | PERCENT (WEIGHT) |
| Xylene | 1330-20-7 | 1.9–5.5 |
| Aromatic hydrocarbons mixture (C9–G12) | 54742-98 6 | 0.3–9.4 |
| 1,2,4-Trimethyl-Benzene | 95-63-6 | 0.3–5.2 |
| Butoxypropanol | 51331-86-8 | 0–4.0 |
| White spirit | 64742-82.1 | 1.2–3.9 |
| Aluminum (inter alia) | 7429-90-5 | 1.3–3.6 |

TABLE 5

| SURE COAT NO. 1601 | |
|---|---|
| COMPONENT | PERCENT (WEIGHT) |
| PGME | 5–10 |
| PTFE Dispersion | 1–5 |
| Dibutyl phthalate | 1–5 |
| C6–C13 acetates | 0–5 |
| Colorant | 0–5 |
| $H_2O$ | >50% |

TABLE 6

| SH 8070 | |
|---|---|
| COMPONENT | PERCENT (WEIGHT) |
| n-butyl acetate | 32.9 |
| Polyester resin | 27.7 |
| Polyacrylate resin | 13.7 |
| Silica | 8.9 |
| Xylene | 4.8 |
| Methoxypropylene acetate | 3.6 |
| Aromatic hydrocarbons C9–C12 | 3.4 |
| Ethyl benzene | 2 |

TABLE 6-continued

| SH 8070 | |
|---|---|
| COMPONENT | PERCENT (WEIGHT) |
| 1,2,4-Trimethyl benzene | 1.7 |
| 2-(2H benzotriazol-2-yl)-4,6-DTPP | |

What is claimed is:

1. In a method for dyeing leather of the type comprising:

(a) coating onto a leather a composition comprising colorant dispersed in a propylene glycol monomethyl ether solvent system, a dibutyl phthalate elastomer, and an aqueous slurry of tetrafluoroethylene polymer to the surface of leather;

(b) flashing and taping the coating at ambient conditions, and (c) repeating steps (a) and (b) to achieve from 2 to 6 coatings;

the improvement comprising substituting a non-aqueous polyacrylate polymer resin base for the aqueous slurry of tetrafluoroethylene, and adding a mixture of C-3 and C-4 alcohol solvents and n-butyl acetate, instead of the dibutyl phthalate;

wherein the coating composition is non-aqueous; and wherein there is achieved improved colorant penetration, improved flashing time, improved dust-free time, and improved tape time.

2. The method of claim 1 wherein each coating dries in less than 1.0 minute.

3. The method of claim 1 wherein the amount of polyacrylate resin is 5–6% by weight of the composition.

4. The method of claim 1 wherein the C-3 and C-4 alcohols comprise 21–32% by weight of the composition.

5. The method of claim 4 wherein the amount of C-3 and C-4 alcohols comprise 10–15% by weight isobutyl alcohol, 8–12% by weight isopropyl alcohol, and 3–5% by weight n-butanol, based on the overall composition.

6. The method of claim 1 wherein the amount of n-butyl acetate is 20–25% by weight of the composition.

* * * * *

UNITED STATES PATENT AND TRADEMARK OFFICE

CERTIFICATE OF CORRECTION

PATENT NO. : 7,001,435 B2
DATED : February 21, 2006
INVENTOR(S) : Doug Slattery et al.

It is certified that error appears in the above-identified patent and that said Letters Patent is hereby corrected as shown below:

<u>Title page,</u>
Item [57], ABSTRACT,
Line 1, “wit” should be -- with --.

Signed and Sealed this

Twenty-fifth Day of April, 2006

Jon W. Dudas

JON W. DUDAS
*Director of the United States Patent and Trademark Office*